US011297287B2

(12) United States Patent
Fujimori et al.

(10) Patent No.: US 11,297,287 B2
(45) Date of Patent: Apr. 5, 2022

(54) METHOD OF CONTROLLING DISPLAY DEVICE, AND DISPLAY DEVICE

(71) Applicant: SEIKO EPSON CORPORATION, Tokyo (JP)

(72) Inventors: Toshiki Fujimori, Chino (JP); Shingo Yoshida, Matsumoto (JP); Takaaki Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 16/896,288

(22) Filed: Jun. 9, 2020

(65) Prior Publication Data

US 2020/0389630 A1 Dec. 10, 2020

(30) Foreign Application Priority Data

Jun. 10, 2019 (JP) ............................ JP2019-107734

(51) Int. Cl.
*H04N 9/31* (2006.01)
*G09G 5/00* (2006.01)

(52) U.S. Cl.
CPC ........... *H04N 9/3147* (2013.01); *G09G 5/003* (2013.01); *H04N 9/3135* (2013.01); *G09G 2370/12* (2013.01)

(58) Field of Classification Search
None
See application file for complete search history.

(56) References Cited

U.S. PATENT DOCUMENTS

| | | | | |
|---|---|---|---|---|
| 7,644,216 B2 | 1/2010 | Fahr et al. | | |
| 8,237,624 B2 | 8/2012 | Zeng et al. | | |
| 8,914,549 B2 | 12/2014 | Klughart | | |
| 2002/0075886 A1 | 6/2002 | Tagore-Brage et al. | | |
| 2002/0089531 A1 | 7/2002 | Hirasawa | | |
| 2004/0150650 A1* | 8/2004 | Mendelson | ........... | G09G 5/005 345/589 |
| 2007/0233903 A1 | 10/2007 | Pyeon | | |
| 2008/0155073 A1 | 6/2008 | Swain | | |
| 2013/0061271 A1 | 3/2013 | Lu | | |

(Continued)

FOREIGN PATENT DOCUMENTS

| | | |
|---|---|---|
| JP | 2012-019442 A | 1/2012 |
| JP | 2017-142339 A | 8/2017 |
| JP | 2019-024180 A | 2/2019 |

OTHER PUBLICATIONS

Apr. 13, 2021 Office Action Issued in U.S. Appl. No. 16/925,414.

*Primary Examiner* — Michelle M Iacoletti
*Assistant Examiner* — Danell L Owens
(74) *Attorney, Agent, or Firm* — Oliff PLC

(57) ABSTRACT

A projector includes a selection section configured to select an interface to which an image signal to be displayed by the projector out of the plurality of interfaces is input, a determination section configured to determine whether or not the interface selected is a compliant interface capable of establishing daisy chain connection, and a function control section configured to make the transition of the projector to a state of preventing a daisy chain function from being executed when the interface selected is not the compliant interface, and when the daisy chain function which can be executed in a state in which the projector is coupled to another projector with the daisy chain connection is set available.

6 Claims, 4 Drawing Sheets

(56) References Cited

U.S. PATENT DOCUMENTS

| | | | |
|---|---|---|---|
| 2015/0287390 | A1 | 10/2015 | Kakeko |
| 2017/0124007 | A1 | 5/2017 | Zehavi et al. |
| 2020/0195880 | A1 | 6/2020 | Momose et al. |

* cited by examiner

METHOD OF CONTROLLING DISPLAY DEVICE, AND DISPLAY DEVICE

The present application is based on, and claims priority from JP Application Serial Number 2019-107734, filed Jun. 10, 2019, the disclosure of which is hereby incorporated by reference herein in its entirety.

BACKGROUND

1. Technical Field

The present disclosure relates to a method of controlling a display device and a display device.

2. Related Art

In the past, there has been known a system of coupling a plurality of display devices using daisy chain connection to operate the plurality of display device in tandem with each other.

For example, JP-A-2012-19442 discloses a projector system having a main projector and a sub-projector coupled to each other using the daisy chain connection. In this projector system, an OSD token is provided to any one of the plurality of projectors, and the projector having the OSD token displays an OSD menu of the own projector.

When a function which can be executed when the daisy chain connection is established with another display device is installed in the display device, it is necessary for the user to switch the setting on whether the function is available or unavailable based on whether or not the daisy chain connection is established among the display devices. This operation is cumbersome for the user.

SUMMARY

An aspect of the present disclosure is directed to a method of controlling a display device configured to display an image based on an image signal, the method including a selecting step of selecting an interface to which the image signal to be displayed by the display device out of a plurality of interfaces provided to the display device, a determining step of determining whether or not the interface selected is a compliant interface capable of establishing daisy chain connection, and a step of making transition of the display device to a state of preventing a function from being executed when the interface selected is not the compliant interface, and when the function which can be executed in a state in which the display device is coupled to another display device with the daisy chain connection is set available.

The method of controlling a display device described above may be configured such that, in the selecting step, when the function of the display device is set available, and the display device is set as a slave machine at start-up of the display device, the compliant interface is selected.

The method of controlling a display device described above may be configured to further include a step of detecting input of the image signal to the plurality of interfaces, wherein in the selecting step, when the function of the display device is set available and the display device is set as a slave machine, and when the input of the image signal to the compliant interface is detected in the detecting step, the compliant interface is selected.

The method of controlling a display device described above may be configured to further include a step of making the display device display an image based on the image signal input to any one of the interfaces, wherein when the compliant interface is selected in the selecting step in a state in which the display device is made to display the image based on the image signal input to the other interface than the compliant interface, display of the image based on the image signal input to the other interface is stopped, and the display device is made to display the image based on the image signal input to the compliant interface in the step of making the display device display the image.

The method of controlling a display device described above may be configured such that the compliant interface is an interface compliant with one of HDMI (registered trademark) and HDBaseT (registered trademark).

Another aspect of the present disclosure is directed to a display device configured to display an image based on an image signal including a plurality of interfaces to which an image signal is input, a selection section configured to select an interface to which the image signal to be displayed by the display device out of the plurality of interfaces, a determination section configured to determine whether or not the interface selected is a compliant interface set in advance compatible with daisy chain connection, and a function control section configured to prevent a function from being executed when the interface selected is not the compliant interface, and when the function which can be executed in a state in which the display device is coupled to another display device with the daisy chain connection is set available.

DESCRIPTION OF AN EXEMPLARY EMBODIMENT

An embodiment of the present disclosure will hereinafter be described with reference to the accompanying drawings.

Figure 1:
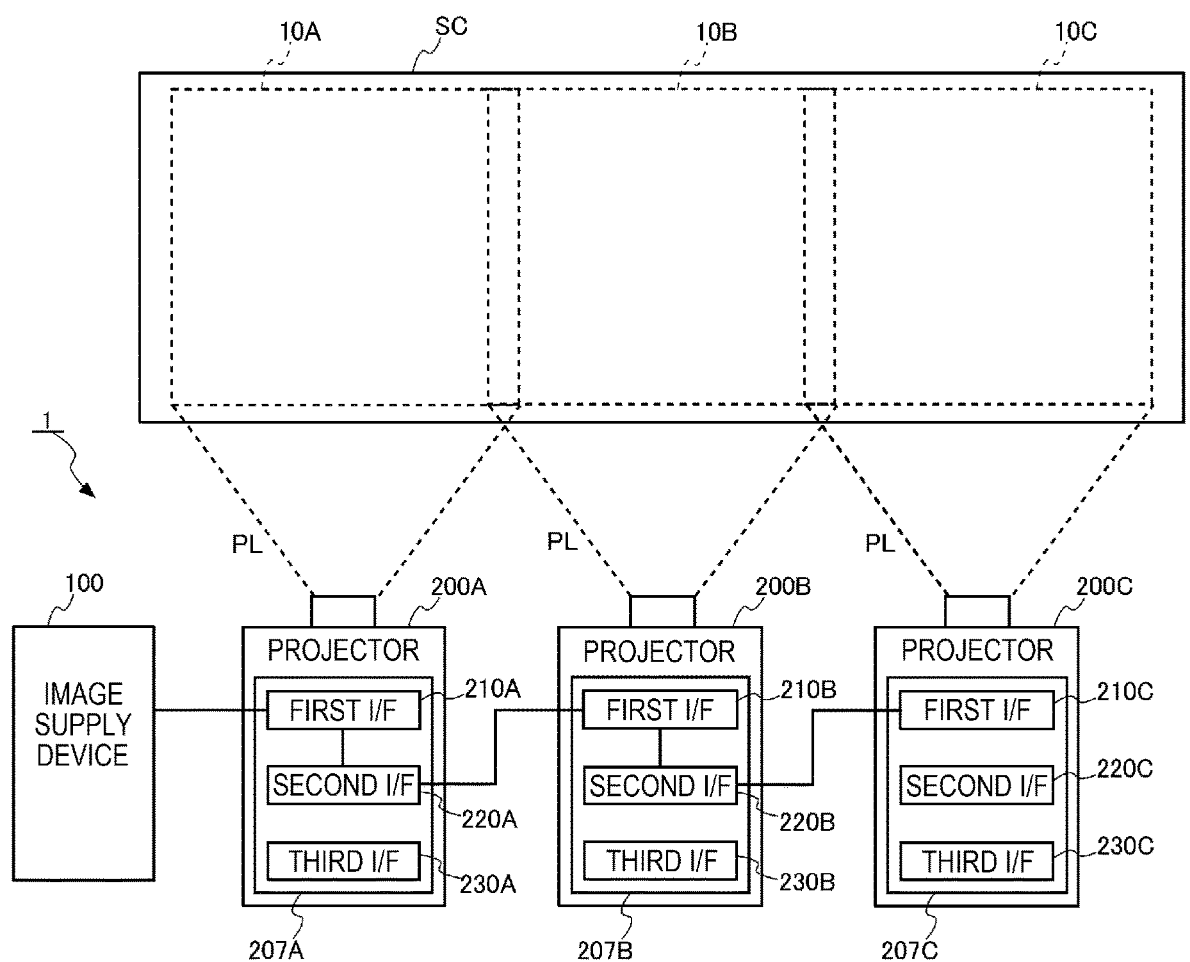
FIG. 1 is a system configuration diagram.

FIG. 1 is a system configuration diagram according to an embodiment to which the present disclosure is applied.

The present embodiment is a system 1 provided with an image supply device 100 and a plurality of projectors 200. The projectors 200 each correspond to an example of a "display device" according to the present disclosure. It is possible to couple the image supply device 100 and the plurality of projectors 200 to each other with the daisy chain. Further, it is also possible to make each of the projectors 200 operate alone. The daisy chain is a method of coupling a plurality of devices performing communication in series to each other with communication lines.

The image supply device 100 is a device of supplying an image signal to the projectors 200. The projectors 200 are each a device for generating image light PL based on the image signal thus supplied, and then projecting the image light PL on a screen SC as a projection surface. On the screen SC, there is displayed an image corresponding to the image light PL. The screen SC is formed of a plane or a curtain, and the specific shape thereof is arbitrary. Further, the projection surface can be a uniform plane such as a wall surface, a ceiling surface, or a floor surface, or can also have a curved surface or an uneven surface.

As the image supply device 100, it is possible to use, for example, a notebook PC (Personal Computer), a desktop PC, a tablet PC, a smartphone, and a PDA (Personal Digital Assistant). Further, as the image supply device 100, it is also possible to use a video reproduction device, a DVD (Digital Versatile Disk) player, a Blu-ray disc player, a hard disk recorder, a television tuner, a set-top box for a CATV (Cable television), a video game device, or the like.

Although in FIG. 1, there are shown the three projectors 200, namely the projector 200A, the projector 200B, and the projector 200C, as the projectors 200, the number of the projectors 200 constituting the system 1 is arbitrary. Hereinafter, the projector 200A, the projector 200B, and the projector 200C are described as the projectors 200 when a collective term therefor is used.

Further, FIG. 1 shows an example in which the three projectors 200, namely the projectors 200A, 200B, and 200C are laterally arranged in the lateral direction of the screen SC. The arrangement of the projectors 200 is not limited to the lateral arrangement shown in FIG. 1, and it is also possible to adopt a matrix arrangement in which the four projectors 200 are arranged 2×2.

The projectors 200A, 200B, and 200C project the image light PL in respective areas different from each other of the screen SC. The area in which the projector 200A projects the image light PL is described as a projection area 10A, the area in which the projector 200B projects the image light PL is described as a projection area 10B, and the area in which the projector 200C projects the image light PL is described as a projection area 10C.

When the image supply device 100 and the plurality of projectors 200 are coupled to each other with the daisy chain connection, the projector 200 located at the head of the daisy chain connection is referred to as a master machine. In other words, the projector 200 which is coupled to the image supply device 100 to receive the image signal from the image supply device 100 is referred to as the master machine. In the present embodiment, the projector 200A operates as the master machine.

Further, in the posterior stage of the projector 200A, there is coupled the projector 200B, and in the posterior stage of the projector 200B, there is coupled the projector 200C. The projector 200A is the projector 200 first in the connection order in the daisy chain connection. The projector 200B is the projector 200 second in the connection order in the daisy chain connection. The projector 200C is the projector 200 third in the connection order in the daisy chain connection. The projectors 200B and 200C which are second and third in the connection order function as slave machines.

The operation when the image supply device 100 and the plurality of projectors 200 are coupled to each other with the daisy chain connection will be described.

The projector 200A receives the image signal supplied from the image supply device 100, and then projects the image light PL based on the image signal thus received in the projection area 10A. Further, the projector 200A outputs the image signal which has been received from the image supply device 100 to the projector 200B in the posterior stage. The projector 200B receives the image signal from the projector 200A, and then projects the image light PL based on the image signal thus received in the projection area 10B. Further, the projector 200B outputs the image signal which has been received from the projector 200A to the projector 200C in the posterior stage. The projector 200C receives the image signal from the projector 200B, and then projects the image light PL based on the image signal thus received in the projection area 10C.

The projectors 200A, 200B, and 200C are each provided with a plurality of interfaces. In other words, it is possible to couple a plurality of image supply devices 100 at the same time to each of the projectors 200A, 200B, and 200C. Although FIG. 1 shows when each of the projectors 200 is provided with the three interfaces, the number of the interfaces provided to each of the projectors 200 is arbitrary, and the number of the interfaces provided to the projector 200 can be different between the projectors 200.

The projector 200A is provided with the three interfaces, namely the first interface 210A, the second interface 220A, and the third interface 230A. The projector 200B is provided with the three interfaces, namely the first interface 210B, the second interface 220B, and the third interface 230B. The projector 200C is provided with the three interfaces, namely the first interface 210C, the second interface 220C, and the third interface 230C.

Hereinafter, the first interface 210A, the second interface 220A, and the third interface 230A are described as the interfaces 207A when a collective term therefor is used. Similarly, the first interface 210B, the second interface 220B, and the third interface 230B are described as the interfaces 207B when a collective term therefor is used. The first interface 210C, the second interface 220C, and the third interface 230C are described as the interfaces 207C when a collective term therefor is used. Further, the interfaces 207A, 207B, and 207C are described as the interfaces 207 when a collective term therefor is used.

The projectors 200A and 200B are each provided with at least two HDMI interfaces. HDMI is a registered trademark. Further, the projector 200C is provided with at least one HDMI interface. The HDMI interface is an interface compliant with the communication standard of HDMI, and is an interface capable of establishing the daisy chain connection. By establishing the daisy chain connection with the HDMI interface, it is possible to output the image signal as a digital signal having been received from a higher-level device directly to a lower-level device.

In the present embodiment, there will be described when the first interface 210A and the second interface 220A of the projector 200A are each the HDMI interface. Further, there will be described when the first interface 210B and the second interface 220B of the projector 200B are each the HDMI interface. Further, there will be described when the first interface 210C is the HDMI interface in the projector 200C.

The communication standards which the third interface 230A, 230B of the projectors 200A, 200B, and the second interface 220C and the third interface 230C of the projector 200C are compliant with are arbitrary. To these interface, it is possible to apply any of the standards described below, for example.

The interfaces can each be, for example, an interface compliant with the standard of a digital interface such as DVI (Digital Visual Interface), HDMI, or Display Port. Further, the interface can be an analog interface such as VGA (Video Graphics Array), a D-terminal, or an S-terminal. Further, the interface can be a communication interface such as USB (Universal Serial Bus), Ethernet, or IEEE 1394. Further, the interface can also be a wireless communication interface such as HDBaseT, Bluetooth, wireless LAN including Wi-Fi, or NFC (Near Field Communication). Ethernet, HDBaseT, Bluetooth, and Wi-Fi are each a registered trademark.

Figure 2:
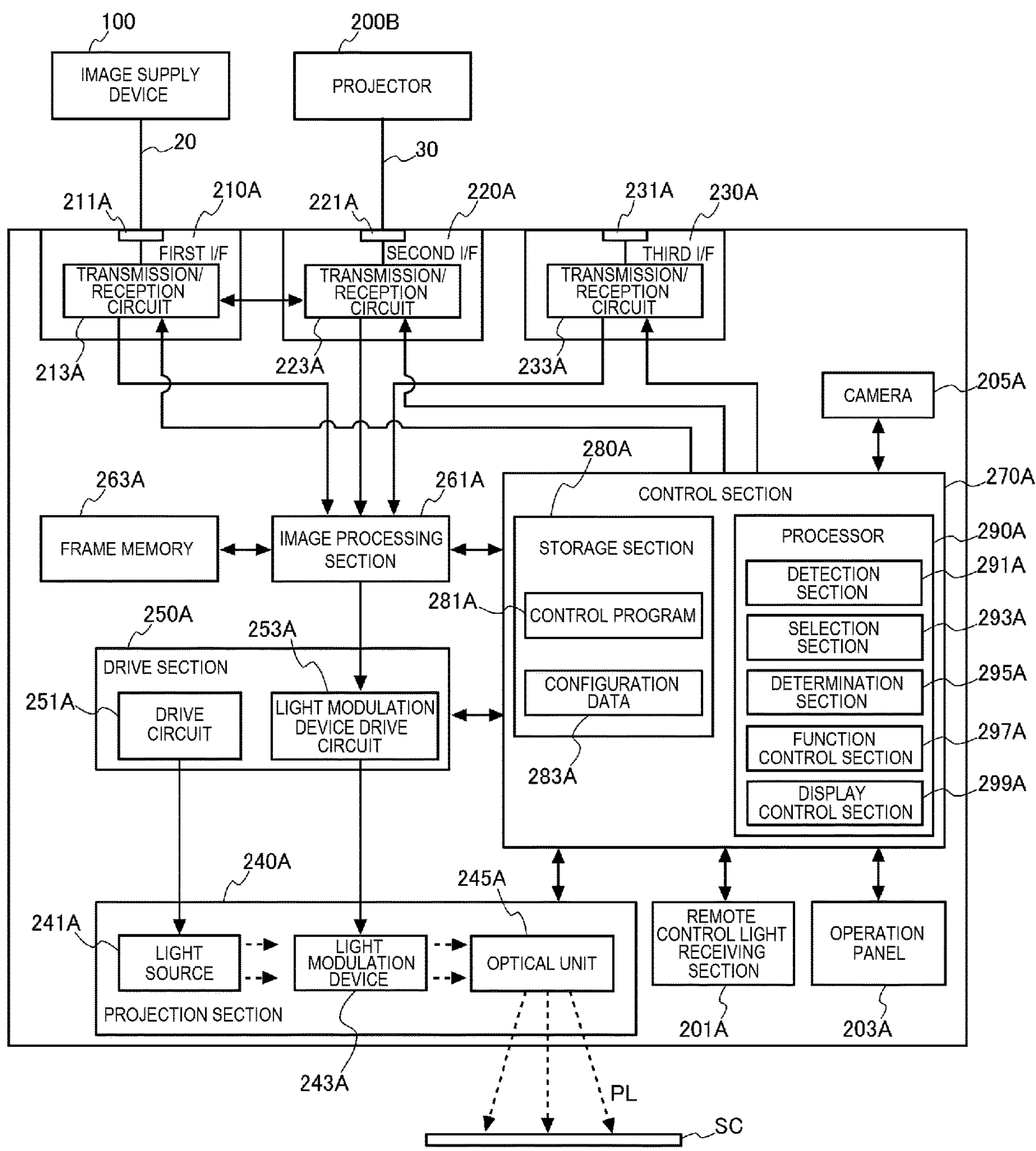
FIG. 2 is a block diagram showing a configuration of a projector.

FIG. 2 is a block diagram showing a configuration of the projector 200A.

The projector 200A, the projector 200B, and the projector 200C have substantially the same configurations. Therefore, the configuration of the projector 200A will representatively be described, and the description of the configurations of other projectors 200B, 200C will be omitted.

It should be noted that since FIG. 2 shows the configuration of the projector 200A, each of the constituents of the projector 200A is denoted by a reference symbol attached with "A." In the following description, "B" is attached to the reference symbol when describing the constituent of the projector 200B, and "C" is attached to the reference symbol when describing the constituent of the projector 200C. For example, a control section of the projector 200A is described as a "control section 270A," and a control section of the projector 200B is described as a "control section 270B," and a control section of the projector 200C is described as a "control section 270C."

The first interface 210A is provided with a connector 211A and a transmission/reception circuit 213A. The second interface 220A is provided with a connector 221A and a transmission/reception circuit 223A. The third interface 230A is provided with a connector 231A and a transmission/reception circuit 233A.

To the connectors 211A, 221A, and 231A, there are coupled cables for coupling the projector 200A and the external device to each other. In the present embodiment, since the first interface 210A and the second interface 220A are each the HDMI interface, the HDMI cables are coupled to the connectors 211A and 221A.

FIG. 2 shows the state in which the image supply device 100, the projector 200A, and the projector 200B are coupled to each other with the daisy chain connection. For example, it is assumed that the image supply device 100 is coupled to the first interface 210A, and the projector 200B is coupled to the second interface 220A as shown in FIG. 2. In this case, the HDMI cable 20 coupled to the image supply device 100 is coupled to the connector 211A, and the HDMI cable 30 coupled to the projector 200B is coupled to the connector 221A.

Further, it is also possible to couple the HDMI cable 20 coupled to the image supply device 100 to the connector 221A, and couple the HDMI cable 30 coupled to the projector 200B to the connector 211A.

To the connectors 211A, 221A, and 231A to which the cables are coupled, there are input the image signal and a control signal. The first interface 210A, the second interface 220A, and the third interface 230A receive the image signal and the control signal thus input with the transmission/reception circuits 213A, 223A, and 233A corresponding respectively to the interfaces 210A, 220A, and 230A.

In the present embodiment, the first interface 210 and the second interface 220A are each an interface compliant with the communication standard of HDMI. Therefore, the transmission/reception circuits 213A and 223A each perform processes such as a serial-to-parallel conversion and a signal level conversion of the image signal thus received. Further, the transmission/reception circuits 213A and 223A each retrieve the image data included in the image signal, and then output the image data thus retrieved to an image processing section 261A. Further, the transmission/reception circuits 213A and 223A each output the control signal thus received to the control section 270A. The control section 270A controls each section of the projector 200A based on the control signal thus input. Further, when the image signal has been input, the transmission/reception circuits 213A and 223A each output a notification signal of giving notice of input of the image signal to the control section 270A.

Further, the transmission/reception circuits 213A, 223A, and 233A are each coupled to the control section 270A. Further, the transmission/reception circuit 213A and the transmission/reception circuit 223A are coupled to each other with a signal line.

It is assumed that the image supply device 100 is coupled to the first interface 210A, the projector 200B is coupled to the second interface 220A as shown in FIG. 2, and a daisy chain function described later is set available. In this case, the control section 270A outputs the image signal received by the first interface 210A to the second interface 220A. The second interface 220A outputs the image signal thus input to the projector 200B via the HDMI cable 30.

Further, it is assumed that the image supply device 100 is coupled to the second interface 220A, the projector 200B is coupled to the first interface 210A, and the daisy chain function is set available. In this case, the control section 270A makes the second interface 220A output the image signal received by the second interface 220A to the first interface 210A. The first interface 210A outputs the image signal thus input to the projector 200B via the HDMI cable 20.

Further, there will be described when the present embodiment has a configuration in which the third interface 230A is provided with the connector 231A compliant with the standard of an analog interface, and the transmission/reception circuit 233A. To the transmission/reception circuit 233A, there is input an analog image signal. The transmission/reception circuit 233A is provided with, for example, an A/D converter, and converts the analog image signal thus input into digital image data with the A/D converter. The illustration of the A/D converter will be omitted. The transmission/reception circuit 233A outputs the image data obtained by the conversion to the image processing section 261A.

Further, the transmission/reception circuit 233A detects that the image signal has been input to the A/D converter to output a notification signal of giving notice of input of the image signal to the control section 270A.

Further, when it is assumed that the third interface 230A is a communication interface, the transmission/reception circuit 233A detects an electrical change in voltage or the like of the connector 231A coupled to a signal line through which data is transmitted and received, and thus detects the input of the image signal. When the electrical change in voltage of the connector 231A has been detected, the transmission/reception circuit 233A outputs the notification signal of giving notice of input of the image signal to the control section 270A. Further, it is also possible for the transmission/reception circuit 233A to detect the input of the image signal when the transmission/reception circuit 233A has received a transmission request for data from the external device coupled to the transmission/reception circuit 233A.

The projector 200A is provided with a remote control light receiving section 201A and an operation panel 203A as a reception section.

The remote control light receiving section 201A receives an infrared signal transmitted by a remote controller not shown. The remote controller also functions as a part of the reception section. The remote control light receiving section 201A outputs an operation signal corresponding to the infrared signal thus received to the control section 270A.

The operation signal is a signal corresponding to a switch of the remote controller operated.

The operation panel 203A is disposed in, for example, a housing of the projector 200A, and is provided with a variety of switches such as a power switch for switching ON and OFF the projector 200A. When the switch in the operation panel 203A is operated, the operation signal corresponding to the switch thus operated is input to the control section 270A.

The projector 200A is provided with a camera 205A. The camera 205A is a so-called digital camera. The camera 205A is provided with an image sensor such as a CCD (Charge Coupled Device) or a CMOS (Complementary Metal Oxide Semiconductor). Further, the camera 205A is provided with a data processing circuit for generating imaging data based on the light reception state of the image sensor. The camera 205A outputs the imaging data thus generated to the control section 270A.

The projector 200A is provided with a projection section 240A for projecting the image light PL, and a drive section 250A for driving the projection section 240A. The projection section 240A is provided with a light source 241A, a light modulation device 243A, and an optical unit 245A. The drive section 250A is provided with a drive circuit 251A and a light modulation device drive circuit 253A.

As the light source 241A, there is used a lamp light source such as a halogen lamp, a xenon lamp, or a super high-pressure mercury lamp. Further, as the light source 241A, there can be used a solid-state light source such as an LED (Light Emitting Diode) or a laser light source.

Further, to the light source 241A, there is coupled a drive circuit 251A. The drive circuit 251A is coupled to the light source 241A and the control section 270A, and supplies the light source 241A with a drive current or a pulse in accordance with the control by the control section 270A to put the light source 241A on or off.

The light modulation device 243A is provided with a light modulation element for modulating light emitted by the light source 241A to generate the image light PL. The light modulation device 243A emits the image light PL modulated by the light modulation element to the optical unit 245A. As the light modulation element, it is possible to use, for example, a transmissive liquid crystal light valve, a reflective liquid crystal light valve, or a digital mirror device.

To the light modulation device 243A, there is coupled a light modulation device drive circuit 253A. The light modulation device drive circuit 253A is coupled to the image processing section 261A and the light modulation device 243A, and draws the image corresponding to the image data input from the image processing section 261A in the light modulation element frame by frame. For example, when the light modulation device 243A is constituted by liquid crystal light valves, the light modulation device drive circuit 253A is formed of a driver circuit for driving the liquid crystal.

The optical unit 245A is provided with an optical element such as a lens or a mirror, and projects the image light PL modulated by the light modulation device 243A toward the screen SC. Thus, the image based on the image light PL is imaged on the screen SC.

The projector 200A is provided with the image processing section 261A and a frame memory 263A. The image processing section 261A develops the image data received by any one of the first interface 210A, the second interface 220A, and the third interface 230A on the frame memory 263A. The frame memory 263A is formed of, for example, an SDRAM (Synchronous Dynamic Random Access Memory).

The image processing section 261A performs image processing on the image data developed on the frame memory 263A. In the image processing performed by the image processing section 261A, there are included, for example, a resolution conversion process or a resizing process, correction of a distortion aberration, a shape correction process, a digital zooming process, and an adjustment of the color shade or the luminance of the image. The image processing section 261A performs the process designated by the control section 270A, and performs the process using a parameter input from the control section 270A as needed. Further, it is obviously possible for the image processing section 261A to execute two or more of the processes described above in combination with each other. The image processing section 261A retrieves the image data from the frame memory 263A, and then outputs the image data thus retrieved to the light modulation device drive circuit 253A.

The image processing section 261A and the frame memory 263A are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, it is also possible for an analog circuit to be included in a part of the configuration of the integrated circuit, or it is also possible to adopt a configuration having the control section 270A and the integrated circuit combined with each other.

The projector 200A is provided with the control section 270A. The control section 270A is a computer provided with a storage section 280A and a processor 290A. The storage section 280A is constituted by a volatile storage device such as a RAM (Random Access Memory), and a nonvolatile storage device such as a ROM (Read Only Memory) or a flash memory. The storage section 280A stores a control program 281A to be executed by the processor 290A.

Further, the storage section 280A stores configuration data 283A. The configuration data 283A is the data set by the user operating the remote controller or the control panel 203A. In the configuration data 283A, there are included the data in which whether the daisy chain function is available or unavailable is set, and information of the connection order in the daisy chain. In the case of the connection state shown in FIG. 1, the connection order of the projector 200A is set first, the connection order of the projector 200B is set second, and the connection order of the projector 200C is set third. The configuration data 283A can be changed by the user operating the remote controller or the control panel 203A.

The daisy chain function is a function of coupling a plurality of devices with the daisy chain. Specifically, there are included a function of outputting the image signal input from a higher-level device to a lower-level device, and a function of retrieving the image data from the image signal supplied from the higher-level device, and then clipping a part of the image data the display of which is taken care of by the projector 200. Further, as the daisy chain function, there can also be included a function of determining whether or not a compliant interface has been selected as the interface 207 when the daisy chain function is set available.

Further, the compliant interface means an interface which can be coupled with the daisy chain connection. Specifically, the compliant interface is an interface capable of outputting the image signal input from the higher-level device to the lower-level device. In the present embodiment, the interface compliant with HDMI or HDBaseT compatible with HDMI is set as the compliant interface. In the case of HDMI or HDBaseT compatible with HDMI, it is possible to output the image signal as a digital signal having been received from the higher-level device directly to the lower-level device.

The processor 290A is an arithmetic processing device formed of a CPU (Central Processing Unit) or an MPU (Micro Processing Unit). The processor 290A executes the control program 281A to control each section of the projector 200A. The processor 290A can be formed of a single processor, or can also be constituted by a plurality of processors. Further, the processor 290A can also be formed of an SoC (System-on-a-Chip) integrated with a part or the whole of the storage section 280A and other circuits. Further, the processor 290A can also be formed of a combination of a CPU for executing a program and a DSP (Digital Signal Processor) for executing a predetermined arithmetic process. Further, it is also possible to adopt a configuration in which all of the functions of the processor 290A are implemented in the hardware, or it is also possible to configure all of the functions of the processor 290A using a programmable device.

The control section 270A functions as a detection section 291A, a selection section 293A, a determination section 295A, a function control section 297A, and a display control section 299A. These blocks represent the functions realized by the processor 290A executing the command set described in the control program 281A to perform arithmetic operations of the data and control with the blocks for descriptive purposes.

The detection section 291A detects input of the image signal to the first interface 210A, the second interface 220A, and the third interface 230A provided to the projector 200A. The detection section 291A detects the interface to which the image signal is currently input based on the notification signals input from the transmission/reception circuits 213A, 223A, and 233A.

The selection section 293A selects the interface 207A to which the image signal representing the image light PL to be projected by the projection section 240A is input out of the first interface 210A, the second interface 220A, and the third interface 230A. The interface 207A to be selected by the selection section 293A is not required to have the image signal input at the moment when the selection section 293A selects the interface 207A. The interface 207A which is selected by the selection section 293A, and to which the image signal representing the image signal PL is input is referred to as a display source.

For example, the selection section 293A stores the information of the interface 207A which has been selected as the display source in the storage section 280A immediately before the projector 200A is powered off. Further, when the projector 200A is powered on to start up the processor 290A, the selection section 293A refers to the storage section 280A to select the interface 207A which has been selected last time as the display source as the display source of this time.

Further, as an operation for other periods than the start-up period, the selection section 293A switches the interface 207A in which the input is detected to the display source when the input of the image signal is detected by the detection section 291A in the state in which the input of the image signal is absent in the interface 207A. Further, it is possible for the selection section 293A to select the interface 207A which is selected by the operation of the remote controller or the operation panel 203A, as the display source.

The determination section 295A refers to the configuration data 283A to determine the configuration of the projector 200A at the start-up of the processor 290A. The determination section 295A determines whether or not the connection order of the projector 200A is first, namely the projector 200A is the master machine, and the daisy chain function is set available. When the daisy chain function is set unavailable, the determination section 295A does not change the display source, and sets the interface 207A selected by the selection section 293A as the display source without any change.

Further, when the connection order of the projector 200A is first, and the daisy chain function is set available, the determination section 295A determines whether or not the interface selected as the display source is the compliant interface. In the case of the present embodiment, the determination section 295A determines whether or not the first interface 210A or the second interface 220A is selected as the display source.

The function control section 297A controls the execution of the daisy chain function. In the daisy chain function for controlling the execution of the function control section 297A, there are included, for example, an image signal output function and an image clipping function.

The image signal output function is a function of outputting the image signal received from the higher-level device to the lower-level device. For example, it is assumed that the image supply device 100 is coupled at a higher level than that of the projector 200A, and the projector 200B is coupled in the posterior stage of the projector 200A as shown in FIG. 2. In this case, the projector 200A outputs the image signal which has been received from the image supply device 100 to the projector 200B in the posterior stage.

Further, the image clipping function is a function of clipping partial image data as a part of the image data from the image data. The function control section 297A outputs clipping range information for clipping the partial image data to the image processing section 261A to make the image processing section 261A perform the clipping of the partial image data. The clipping range information can be set by, for example, the user operating the remote controller or the operation panel 203A, or can also be generated based on the imaging data of the camera 205A.

When generating the clipping range information based on the imaging data by the camera 205A, firstly, the projectors 200A, 200B, and 200C each display a pattern image prepared in advance on the screen SC. Then, the projector 200A, 200B, and 200C image the screen SC on which the pattern images are displayed with the cameras 205A, 205B, and 205C to generate the imaging data, respectively. Subsequently, the projectors 200A, 200B, and 200C detect the image ranges in which the pattern images displayed by the projectors 200A, 200B, and 200C, respectively, from the imaging data. These image ranges form the whole of the range in which the images are displayed by the image light PL projected by the projectors 200A, 200B, and 200C.

Subsequently, the projector 200A alone displays the pattern image on the screen SC, and then images the screen SC on which the pattern image is displayed with the camera 205A to generate the imaging data. The projector 200A detects the range in which the pattern image is taken from the imaging data to thereby detect the image range in which the pattern image displayed by the projector 200A is displayed. Each of the projectors 200B, 200C also performs this process. The projector 200A generates the clipping range information for the projector 200A based on the whole of the image range in which the projectors 200A, 200B, and 200C perform the display and the image range in which the projector 200A performs the display. Further, the process is similarly performed on the other projectors, namely the projectors 200B, 200C to generate the clipping range information, respectively.

Further, when a predetermined condition is fulfilled, the function control section 297A inhibits the daisy chain function from being executed even when the daisy chain function is set available by the configuration data 283A. This predetermined condition corresponds when the connection order of the projector 200A set in the configuration data 283A is first, and the daisy chain function is set available, but the display source thus selected is not the compliant interface.

It is possible for the function control section 297A to rewrite the data related to the setting of the daisy chain function out of the configuration data 283A with the data setting the daisy chain function unavailable to thereby inhibit the daisy chain function from being executed. Further, it is also possible for the function control section 297A to refrain from instructing the image processing section 261A, the first interface 210A, or the second interface 220A to execute the daisy chain function.

The display control section 299A controls the image data to be input from the interface 207A to the image processing section 261A. The display control section 299A selects the interface 207A to which the image data is output from the image processing section 261A based on the determination result by the determination section 295A, and then instructs the interface 207A thus selected to output the image data. The interface 207A having received the instruction from the display control section 299A retrieves the image data from the image signal received, and then outputs the image data thus retrieved to the image processing section 261A.

Then, the operation of the control section 270 when the projector 200 is set as the slave machine will be described. The operation of the control section 270B of the projector 200B will hereinafter be described as a representative.

The selection section 293B also stores the information of the interface 207B which has been selected as the display source in the storage section 280B immediately before the projector 200B is powered off. Further, when the projector 200B is powered on to be started up, the selection section 293B refers to the storage section 280B to select the interface 207B which has been selected last time as the display source as the display source of this time.

When the daisy chain function is set unavailable, the determination section 295B does not change the display source, and sets the interface 207B selected by the selection section 293B as the display source without any change.

Further, when the daisy chain function is set available, and the connection order of the projector 200B is second or third, the determination section 295B determines whether or not the interface selected as the display source is the predetermined compliant interface.

In the case of the projector 200B and the projector 200C as the slave machines, even when two or more interfaces compliant with HDMI are provided, predetermined one of the interfaces is set as the compliant interface. In the present embodiment, the first interface 210B of the projector 200B is set as the compliant interface, and the first interface 210C of the projector 200C is set as the compliant interface.

When the interface selected as the display source by the selection section 293B is not the predetermined compliant interface, the determination section 295B selects the first interface 210B which is the predetermined compliant interface as the display source. Further, when the interface selected as the display source by the selection section 293B is the predetermined compliant interface, the determination section 295B does not change the interface 207B selected as the display source.

When the daisy chain function is set unavailable, the function control section 297B controls the interface 207B and the image processing section 261B so that the daisy chain function is not executed. Further, when the daisy chain function is set available, and the display source thus selected is the compliant interface, the function control section 297B controls the interface 207B and the image processing section 261B so that the daisy chain function is executed.

Further, it is assumed that an interface other than the first interface 210B such as the second interface 220B is selected as the display source, and the image light PL based on the image signal input to the second interface 220B is projected by the projection section 240B.

Further, it is assumed that the interface 207B to which the image signal is currently input is detected by the detection section 291B, and the interface 207B thus detected is the first interface 210B. In this case, the selection section 293B switches the display source from the second interface 220B to the first interface 210B.

When the display source is switched to the first interface 210B, the display control section 299B makes the second interface 220B stop outputting the image data to the image processing section 261B. Further, the display control section 299B instructs the first interface 210B to output the image data to the image processing section 261B. Thus, even while displaying the image based on the image signal input to another interface 207B, it is possible to stop to display the image to display an image based on the image signal input to the first interface 210B.

Figure 3:
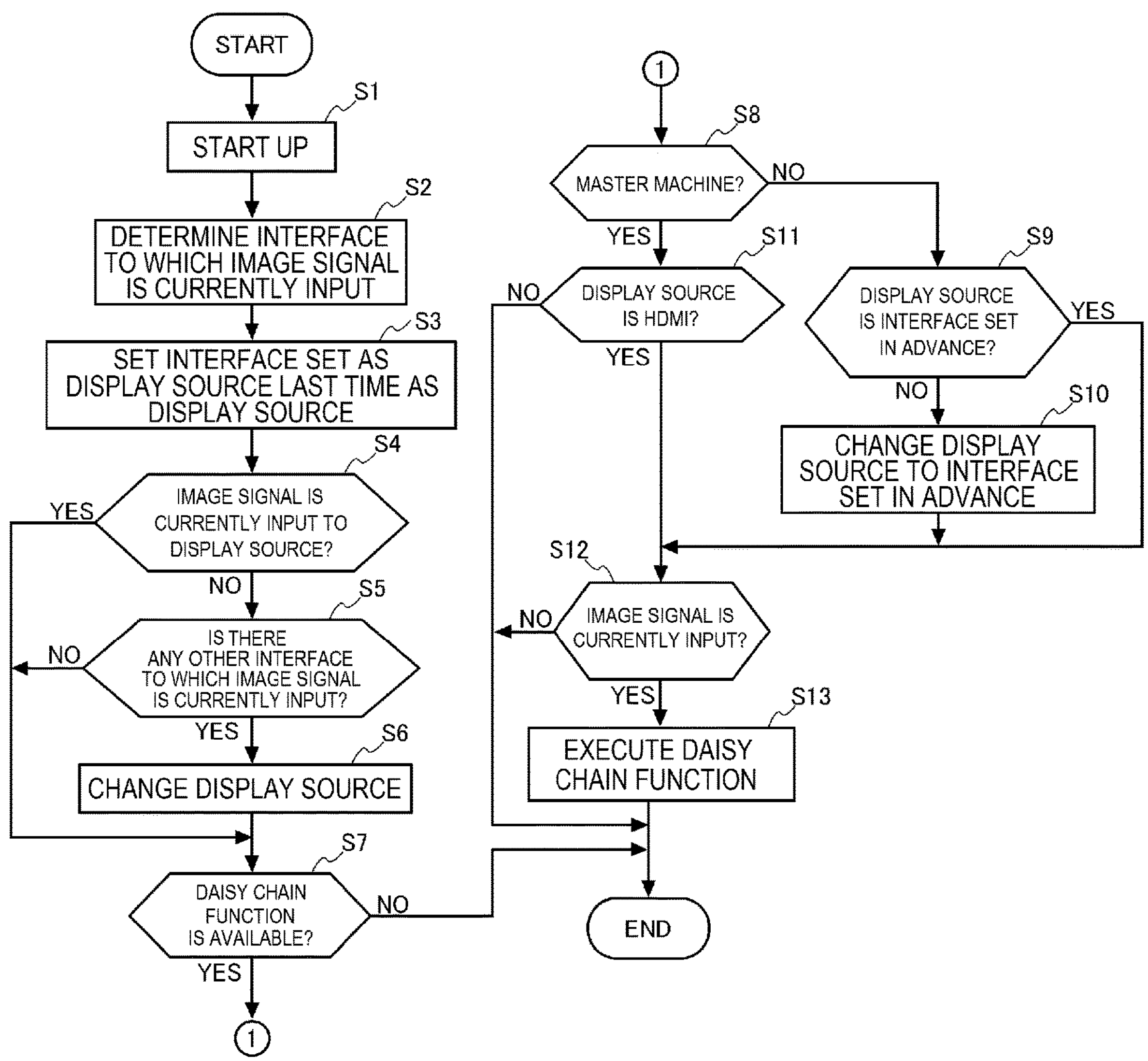
FIG. 3 is a flowchart showing an operation of the projector.

FIG. 3 is a flowchart showing the operation of the projector 200.

Here, the description is presented as the operation of the projector 200 without distinguishing the projector 200A as the master machine and the projectors 200B, 200C as the slave machines from each other.

When the power switch of the projector 200 is turned on to supply the power to the projector 200, the control section 270 starts up (step S1) to start the process. Firstly, the control section 270 determines (step S2) the interface 207 to which the image signal is currently input. For example, when receiving the image signal, the control section 270 determines the interface 207 to which the image signal is currently input based on the notification signal input from the transmission/reception circuits 213, 223, and 233. Here, when there is no interface 207 to which the image signal is currently input, the control section 270 stores the data representing "none" in the storage section 280. Further, when the interface 207 to which the image signal is currently input exists, the control section 270 stores the identification data of the interface 207 to which the image signal is currently input in the storage section 280.

Then, the control section 270 sets (step S3) the interface 207 which has been set as the display source before the projector 200 has been switched off. The step S3 corresponds to a "selecting step" in the present disclosure.

Then, the control section 270 determines (step S4) whether or not the image signal is currently input to the interface 207 set as the display source. When the image signal is currently input to the interface 207 set as the display source (YES in the step S4), the control section 270 makes the transition to the determination in the step S7.

Further, when the image signal is not currently input to the interface 207 set as the display source (NO in the step S4), the control section 270 determines (step S5) whether or not there is any other interface 207 to which the image signal is currently input. When there is no other interface 207 to which the image signal is currently input (NO in the step S5), the control section 270 makes the transition to the determination in the step S7 without switching the display source.

Further, when there is another interface 207 to which the image signal is currently input (YES in the step S5), the control section 270 changes (step S6) the display source to the another interface 207 to which the image signal is currently input. Here, when there are two or more other interfaces 207 to which the image signal is currently input, it is possible to set the interface 207 high in priority as the display source based on the priority set in advance to each of such interfaces 207.

Then, the control section 270 refers to the configuration data 283 to determine (step S7) whether or not the daisy chain function is set available. When the daisy chain function is set unavailable (NO in the step S7), the control section 270 terminates the processing flow. Further, when the daisy chain function is set available (YES in the step S7), the control section 270 refers to the configuration data 283 to determine (step S8) whether or not the projector 200 itself is the master machine. In other words, the control section 270 determines whether or not the projector 200 is the first projector in the daisy chain connection.

When the projector 200 is not the master machine (NO in the step S8), namely when the projector 200 is the slave machine, the control section 270 determines (step S9) whether or not the interface 207 set in advance is set as the display source. For example, the first interface 210B of the projector 200B and the first interface 210C of the projector 200C are each set as the interface 207 set in advance.

When the display source is not the interface 207 set in advance (NO in the step S9), the control section 270 changes (step S10) the display source to the interface 207 set in advance. The determinations in the steps S9 and S10 correspond to the "selecting step" in Claim 2 of the appended claims. Further, when the interface 207 set in advance is set as the display source (YES in the step S9), the control section 270 makes the transition to the process in the step S12.

Further, when the projector 200 is the master machine (YES in the step S8), the control section 270 determines (step S11) whether or not the interface 207 set as the display source is the interface 207 compliant with the standard of HDMI. The step S11 corresponds to a "determining step" in the present disclosure. When the interface 207 set as the display source is not the interface compliant with the standard of HDMI (NO in the step S11), the control section 270 performs the control so that the daisy chain function is not executed. Specifically, the control section 270 performs the control so that the first interface 210 does not output the image signal received to the second interface 220. Further, the control section 270 does not output the clipping range information to the image processing section 261, and does not make the image processing section 261 execute the process of dividing the image data into partial image data. This process corresponds to a "step of making transition of the display device to a state of preventing a function from being executed" in the present disclosure.

Further, when the interface 207 set as the display source is the interface 207 compliant with the standard of HDMI (YES in the step S11), the control section 270 determines (step S12) whether or not the image signal is currently input to this interface 207. When the image signal is not currently input to the interface 207 set as the display source (NO in the step S12), the control section 270 terminates the processing flow without executing the daisy chain function. After terminating the processing flow, when the input of the image signal to the interface 207 set as the display source is detected, the control section 270 executes the daisy chain function. Further, when the image signal is currently input to the interface 207 set as the display source (YES in the step S12), the control section 270 executes (step S13) the daisy chain function.

Figure 4:
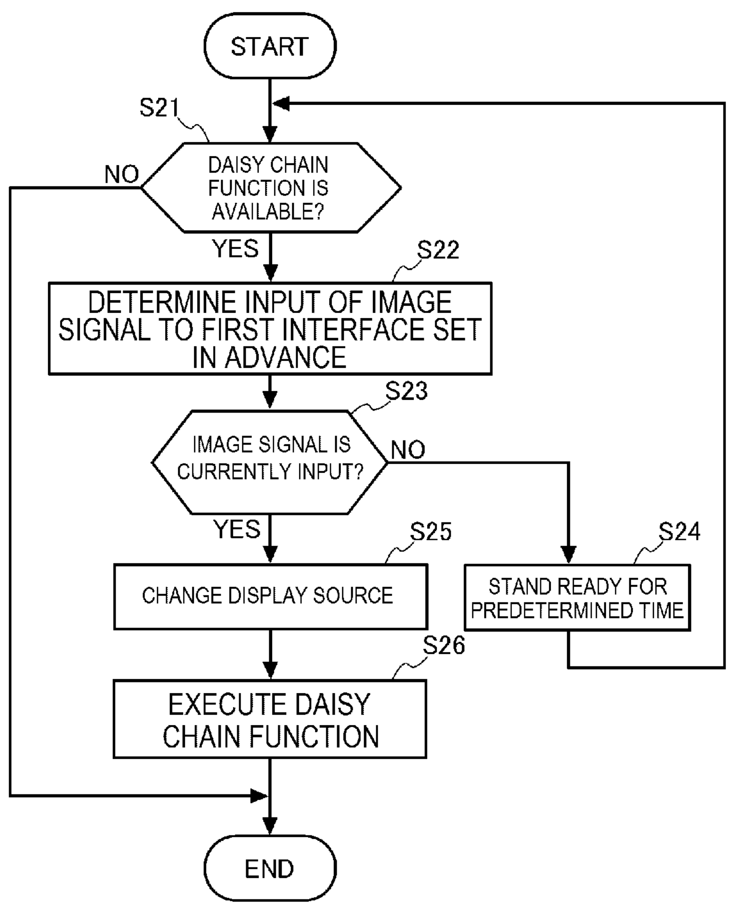
FIG. 4 is a flowchart showing an operation of the projector.

FIG. 4 is a flowchart showing an operation of the projectors 200B and 200C as the slave machines. In particular, FIG. 4 shows an operation of the projectors 200B and 200C when the input of the image signal has been detected in the first interfaces 210B, 210C as the interface 207 set in advance. Since the projectors 200B and 200C perform the same operation, the operation of the projector 200B will hereinafter be described as an example.

Firstly, the control section 270B refers to the configuration data 283B to determine (step S21) whether or not the daisy chain function is available. When the daisy chain function is not set available (NO in the step S21), the control section 270B terminates the processing flow.

Further, when the daisy chain function is set available (YES in the step S21), the control section 270B determines (step S22) whether or not the image signal is currently input to the first interface 210B set in advance. The step S22 corresponds to "a step of detecting input of the image signal" in Claim 3 of the appended claims. When the image signal is not input to the first interface 210B set in advance (NO in the step S23), the control section 270B stands ready (step S24) for a predetermined time set in advance. Subsequently, the control section 270B determines (step S21) again whether or not the daisy chain function is set available.

Further, when the image signal is currently input to the first interface 210B set in advance (YES in the step S23), the control section 270B changes (step S25) the display source to the first interface 210B. In other words, even when, for example, the image signal is input to the third interface 230B, and the image light PL based on the image signal thus input is currently projected on the screen SC, the control section 270B stops projecting the image light PL to project the image light PL based on the image signal input to the first interface 210B. After changing the display source, the control section 270B executes (step S26) the daisy chain function. In other words, the image light PL based on the image signal input to the first interface 210B to which the display source has been changed is projected by the projection section 240B. The steps S25 and S26 correspond to a "displaying step" in Claim 4 of the appended claims.

As described hereinabove, the projectors 200 according to the present embodiment are each provided with the first interface 210, the second interface 220, and the third interface 230 as the plurality of interfaces. Further, the projectors 200 are each provided with the selection section 293, the determination section 295, and the function control section 297.

The selection section 293 selects the interface to which the image signal to be displayed by the projector 200 is input out of these plural interfaces.

The determination section 295 determines whether or not the interface selected by the selection section 293 is the compliant interface capable of being coupled with the daisy chain connection.

The function control section 297 prevents the daisy chain function which can be executed in the state in which the daisy chain connection is established from being executed when the condition is fulfilled. The condition corresponds to the case where the interface thus selected is not the compliant interface, and the daisy chain function, which can be executed in the state in which the projector 200 is coupled to the other projectors 200 with the daisy chain connection, is set available.

Therefore, when the interface thus selected is not the compliant interface, even when the daisy chain function, which can be executed in the state of being coupled with the daisy chain connection, is set available, the daisy chain function is not executed. Therefore, the usability for the user can be improved.

Further, when the daisy chain function of the projector 200 is set available, and the projector 200 is set as the slave machine at the start-up of the projector 200, the selection section 293 selects the compliant interface.

Therefore, by setting the daisy chain function available and setting the projector 200 as the slave machine in advance, it is possible to select the compliant interface at the start-up of the projector 200. Therefore, the usability for the user can be improved.

Further, the projectors 200 are each provided with the detection section 291.

The detection section 291 detects the input of the image signal to the plurality of interfaces.

When the daisy chain function is set available and the projector 200 is set as the slave machine, and when the input of the image signal to the compliant interface is detected by the detection section 291, the selection section 293 selects the compliant interface.

Therefore, when the input of the image signal to the compliant interface is detected, it is possible to make the projector 200 project the image light PL based on the image signal input to the compliant interface.

Further, the projectors 200 are each provided with the display control section 297.

The display control section 297 makes the projection section 240 project the image based on the image signal input to any one of the plurality of interfaces.

When the compliant interface is selected by the selection section 293 in the state in which the projector 200 is made to display the image based on the image signal input to the other interface than the compliant interface, the display control section 297 stops displaying the image based on the image signal input to the other interface, and then makes the projection section 240 project the image based on the image signal input to the compliant interface.

Therefore, even when the image light PL based on the image signal input to the other interface is projected, when the input of the image signal to the compliant interface is detected, it is possible to project the image light PL based on the image signal input to the compliant interface.

Further, the compliant interface is the interface compliant with HDMI or HDBaseT.

Therefore, the image signal digitally input thereto can be output to the projector 200 in the posterior stage without any change.

The embodiment described above is a preferred embodiment of the present disclosure. It should be noted that the embodiment described above is not a limitation, and a variety of modifications can be implemented within the scope or the spirit of the present disclosure.

For example, in the embodiment described above, there is described when the interfaces 207 provided to the projectors 200 are the interfaces compatible with a wired system. Further, there is described when the compliant interfaces are the interfaces compatible with the HDMI interface. As the modified example, it is possible for the compliant interface to be the interface compatible with HDBaseT as the wireless standard compliant with HDMI. For example, it is possible for at least one of the first interface 210A and the second interface 220A of the projector 200A to be the interface compliant with HDBaseT. The same applies to the projectors 200B and 200C.

Further, in the embodiment described above, the light modulation element provided to the light modulation device 243 can be a transmissive liquid crystal panel or can also be a reflective liquid crystal panel. Further, it is also possible for the light modulation element to have a configuration using a digital mirror device, or to have a configuration having the digital mirror device and a color wheel combined with each other. Further, besides the liquid crystal panel or the DMD, configurations capable of modulating the light emitted by the light source can also be adopted as the light modulation device 243.

Further, each of the functional sections of the projector 200A shown in FIG. 2 is for showing the functional configuration, and the specific mounting forms are not particularly limited. In other words, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiment described above can also be realized by hardware, and a part of the function realized by hardware can also be realized by software. Besides the above, the specific detailed configuration of each of other sections than the projector can arbitrarily be modified within the scope or the spirit of the present disclosure.

Further, the processing units of the flowcharts shown in FIG. 3 and FIG. 4 are obtained by dividing the process of the projector 200 in accordance with major processing contents in order to make the process of the projector 200 easy to understand. The scope of the present disclosure is not limited by the way of the division or the names of the processing units shown in the flowcharts of FIG. 3 and FIG. 4. Further, the process of the control section 270 can also be divided into a larger number of processing units, or can also be divided so that one processing unit includes a larger amount of process in accordance with the processing contents. Further, the processing sequence of the flowchart described above is not limited to the illustrated example.

Further, when realizing the method of controlling a display device using a computer provided to the projector 200, it is also possible to configure the program to be executed by the computer as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to the server device. Blu-ray is a registered trademark.

What is claimed is:

1. A method of controlling a display device configured to display an image based on an image signal, the method comprising:

a selecting step of selecting an interface to which the image signal to be displayed by the display device out of a plurality of interfaces provided to the display device is input;

a determining step of determining whether or not the interface selected is a compliant interface configured to establish daisy chain connection; and a step of making transition of the display device to a state of preventing a function from being executed when the interface selected is not the compliant interface, and when the function which can be executed in a state in which the display device is coupled to another display device with the daisy chain connection is set available.

2. The method of controlling a display device according to claim 1, wherein in the selecting step, when the function of the display device is set available, and the display device is set as a slave machine at start-up of the display device, the compliant interface is selected.

3. The method of controlling a display device according to claim 1, further comprising:

a step of detecting input of the image signal to the plurality of interfaces, wherein in the selecting step, when the function of the display device is set available and the display device is set as a slave machine, and when the input of the image signal to the compliant interface is detected in the detecting step, the compliant interface is selected.

4. The method of controlling a display device according to claim 3, further comprising:

a step of making the display device display an image based on the image signal input to any one of the interfaces, wherein when the compliant interface is selected in the selecting step in a state in which the display device is made to display the image based on the image signal input to the other interface than the compliant interface, display of the image based on the image signal input to the other interface is stopped, and the display device is made to display the image based on the image signal input to the compliant interface in the step of making the display device display the image.

5. The method of controlling a display device according to claim 1, wherein the compliant interface is an interface compliant with one of HDMI (registered trademark) and HDBaseT (registered trademark).

6. A display device configured to display an image based on an image signal, comprising:

a plurality of interfaces to which an image signal is input;

a selection section configured to select an interface to which the image signal to be displayed by the display device out of the plurality of interfaces is input;

a determination section configured to determine whether or not the interface selected is a compliant interface set in advance compatible with daisy chain connection; and a function control section configured to prevent a function from being executed when the interface selected is not the compliant interface, and when the function which can be executed in a state in which the display device is coupled to another display device with the daisy chain connection is set available.

* * * * *